US009077756B1

(12) United States Patent
FitzGerald

(10) Patent No.: US 9,077,756 B1
(45) Date of Patent: Jul. 7, 2015

(54) LIMITING EXTERNAL DEVICE ACCESS TO MOBILE COMPUTING DEVICES ACCORDING TO DEVICE TYPE AND CONNECTION CONTEXT

(75) Inventor: Kelly FitzGerald, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 14 days.

(21) Appl. No.: 13/412,588

(22) Filed: Mar. 5, 2012

(51) Int. Cl.
*G06F 17/00* (2006.01)
*H04L 29/06* (2006.01)
*H04W 88/02* (2009.01)

(52) U.S. Cl.
CPC .............. *H04L 63/20* (2013.01); *H04W 88/02* (2013.01)

(58) Field of Classification Search
CPC ...... G06F 21/55; H04W 12/08; H04W 88/02; H04L 63/08; H04L 63/10; H04L 63/20; H04L 63/1441
See application file for complete search history.

(56) References Cited

U.S. PATENT DOCUMENTS

| 6,088,448 | A * | 7/2000 | Poirel ........................... 379/438 |
| 6,417,668 | B1 * | 7/2002 | Howard et al. ................ 324/426 |
| 6,510,524 | B1 * | 1/2003 | Osborn et al. ................. 713/323 |
| 6,574,452 | B1 * | 6/2003 | Morvan et al. ................ 455/11.1 |
| 6,732,176 | B1 * | 5/2004 | Stewart et al. ................. 709/227 |
| 6,901,251 | B1 * | 5/2005 | Kiessling et al. ............. 455/410 |
| 7,082,315 | B2 * | 7/2006 | Bar-On .......................... 455/518 |
| 7,724,026 | B1 * | 5/2010 | Tan ................................. 326/30 |
| 7,823,214 | B2 * | 10/2010 | Rubinstein et al. ............. 726/34 |
| 7,948,246 | B2 * | 5/2011 | Agevik et al. ................. 324/691 |
| 8,060,577 | B1 * | 11/2011 | Conrad .......................... 709/216 |
| 8,237,414 | B1 * | 8/2012 | Li et al. .......................... 320/160 |
| 8,281,388 | B1 * | 10/2012 | Sobel et al. ...................... 726/16 |
| 8,413,244 | B1 * | 4/2013 | Nachenberg ..................... 726/23 |
| 8,635,700 | B2 * | 1/2014 | Richard et al. ................... 726/24 |
| 8,661,547 | B1 * | 2/2014 | Kononov et al. ................. 726/24 |
| 8,776,242 | B2 * | 7/2014 | McDougal ....................... 726/25 |
| 8,806,037 | B1 * | 8/2014 | Kalra et al. ................... 709/229 |

(Continued)

FOREIGN PATENT DOCUMENTS

JP 2005260461 A * 9/2005

OTHER PUBLICATIONS

Chaugule, "Interrupt and IPC Driven Kernel Framework for Prevention against Smartphone Malware", Pennsylvania State University Graduate School, May 2009, 64 pages.*

(Continued)

*Primary Examiner* — Andrew Nalven
*Assistant Examiner* — Walter Malinowski
(74) *Attorney, Agent, or Firm* — Brill Law Office; Jeffrey Brill

(57) ABSTRACT

Access to a mobile computing device by a connected external device is limited, based on the context of the connection. The connection of the mobile computing device to an external device is detected. An identifier of the connected external device is gleaned, and the gleaned identifier is looked-up in a database of mappings between identifiers and descriptions of specific devices. The connected external device is classified as being of a specific functional category, based on the gleaned identifier and the description of the external device from the database. The functional category describes a legitimate function to be performed by the connected external device, such as data synchronizing, media playing or battery charging. The external device is provided with a level of access to the mobile computing device based on the classified functional category.

9 Claims, 4 Drawing Sheets

(56) References Cited

U.S. PATENT DOCUMENTS

| | | | |
|---|---|---|---|
| 2002/0032807 A1* | 3/2002 | Tavallaei | 710/2 |
| 2002/0186121 A1* | 12/2002 | Yoshikawa et al. | 340/5.28 |
| 2004/0059205 A1* | 3/2004 | Carlson et al. | 600/310 |
| 2004/0103223 A1* | 5/2004 | Gabehart et al. | 710/2 |
| 2005/0064822 A1* | 3/2005 | Higgins et al. | 455/90.2 |
| 2005/0097248 A1* | 5/2005 | Kelley | 710/72 |
| 2006/0055538 A1* | 3/2006 | Ritter | 340/572.1 |
| 2006/0112427 A1* | 5/2006 | Shahbazi | 726/16 |
| 2006/0224742 A1* | 10/2006 | Shahbazi | 709/226 |
| 2007/0038785 A1* | 2/2007 | Varanda et al. | 710/62 |
| 2007/0049103 A1* | 3/2007 | Kashi et al. | 439/396 |
| 2007/0123216 A1* | 5/2007 | Cantini et al. | 455/411 |
| 2007/0214428 A1* | 9/2007 | Krampitz et al. | 715/771 |
| 2007/0226501 A1* | 9/2007 | Saitoh | 713/170 |
| 2008/0096585 A1* | 4/2008 | Willey | 455/458 |
| 2008/0146344 A1* | 6/2008 | Rowe et al. | 463/42 |
| 2008/0211955 A1* | 9/2008 | Avital et al. | 348/335 |
| 2008/0233919 A1* | 9/2008 | Kenney | 455/411 |
| 2008/0238371 A1* | 10/2008 | Tamezane | 320/134 |
| 2008/0270490 A1* | 10/2008 | Watterott et al. | 707/204 |
| 2009/0006656 A1* | 1/2009 | Yanagi | 710/3 |
| 2009/0177685 A1* | 7/2009 | Ellis et al. | 707/103 R |
| 2009/0191914 A1* | 7/2009 | Stahl | 455/557 |
| 2009/0222592 A1* | 9/2009 | Anderson et al. | 710/8 |
| 2009/0222907 A1* | 9/2009 | Guichard | 726/17 |
| 2009/0276700 A1* | 11/2009 | Anderson et al. | 715/700 |
| 2010/0023934 A1* | 1/2010 | Sheehan et al. | 717/168 |
| 2010/0058470 A1* | 3/2010 | Kim | 726/22 |
| 2010/0077441 A1* | 3/2010 | Thomas et al. | 725/133 |
| 2010/0159877 A1* | 6/2010 | Salkini et al. | 455/411 |
| 2010/0172090 A1* | 7/2010 | Chatterjee | 361/679.58 |
| 2010/0206565 A1* | 8/2010 | Embry et al. | 166/272.3 |
| 2010/0234068 A1* | 9/2010 | Bolton et al. | 455/557 |
| 2010/0235638 A1* | 9/2010 | Irvine | 713/168 |
| 2010/0306229 A1* | 12/2010 | Timm et al. | 707/767 |
| 2010/0318699 A1* | 12/2010 | Gao-Saari et al. | 710/72 |
| 2011/0125601 A1* | 5/2011 | Carpenter et al. | 705/26.1 |
| 2011/0163859 A1* | 7/2011 | Chraime et al. | 340/309.16 |
| 2011/0167470 A1* | 7/2011 | Walker et al. | 726/1 |
| 2011/0167474 A1* | 7/2011 | Sinha et al. | 726/1 |
| 2011/0184825 A1* | 7/2011 | Christmas | 705/26.1 |
| 2011/0199123 A1* | 8/2011 | Maher et al. | 327/50 |
| 2011/0202689 A1* | 8/2011 | Koenig et al. | 710/9 |
| 2011/0269513 A1* | 11/2011 | Lin et al. | 455/573 |
| 2012/0015629 A1* | 1/2012 | Olsen et al. | 455/411 |
| 2012/0063305 A1* | 3/2012 | Chiu et al. | 370/230 |
| 2012/0071215 A1* | 3/2012 | Bourque et al. | 455/573 |
| 2012/0115449 A1* | 5/2012 | Bruchelt | 455/415 |
| 2012/0198101 A1* | 8/2012 | Porcella et al. | 710/12 |
| 2012/0289080 A1* | 11/2012 | Huang et al. | 439/502 |
| 2012/0311207 A1* | 12/2012 | Powers et al. | 710/106 |
| 2013/0097660 A1* | 4/2013 | Das et al. | 726/1 |
| 2013/0227694 A1* | 8/2013 | Weinstein et al. | 726/25 |

OTHER PUBLICATIONS

Hu, "Internet-Enabled Mobile Handheld Devices for Mobile Commerce", Contemporary Management Research, vol. 01, No. 1, Sep. 2005, pp. 13-34.*

* cited by examiner

LIMITING EXTERNAL DEVICE ACCESS TO MOBILE COMPUTING DEVICES ACCORDING TO DEVICE TYPE AND CONNECTION CONTEXT

TECHNICAL FIELD

This disclosure pertains generally to computer security, and more specifically to protecting mobile computing devices from malicious code attacks and data theft by external devices to which they connect.

BACKGROUND

Mobile computing devices such as smartphones and tablet computers are becoming more widely used every day. Not only are these devices popular for communication (e.g., phone, email, texting, chat), but they are also commonly used to create content (e.g., pictures and videos), play games, access social networks, as well as to play music and watch videos. A large selection of applications ("apps") that run on mobile computing devices are available for download.

Unfortunately, as mobile computing devices become more widely used, malicious code targeting these devices is also becoming more common. People frequently execute credit card and banking transactions from their mobile computing devices, which can be a target of malicious attacks. People also store a lot sensitive data on their smartphones, such as their contacts, calendars, personal photographs, emails, text messages, etc. Having such data stolen by malware is a serious concern.

Although powerful in their own right, it is common to connect smartphones to other devices, for example to charge the battery, to look at pictures or watch video stored on the device on a larger screen, to play stored music through a better sound system, or to synchronize data on the device with the user's primary computer. Connecting a smartphone or the like to another device creates a risk of infection by malicious code or theft of data. The potential infection vector can be in either direction, i.e., from the external device to the mobile device or vice versa.

Users typically at least recognize that the desktops to which they connect mobile devices to synchronize data are computers. Users are generally less mindful of connecting their devices to music systems and chargers. For example, modern cars often come with in-dash systems with a fair amount of computing functionality, such as the ability to stream videos and television (though only legally if rear mounted), act as a closed caption TV with a backup camera installed, perform navigation functions, take voice commands from the driver, etc. It is standard for such systems to include Universal Serial Bus (USB) and Bluetooth connections for phones, music players, and the like. It is also common to plug mobile computing devices into chargers, including charging stations in public places such as airports. A wide selection of stereo systems, alarm clocks, docking stations, chargers and other devices are manufactured and marketed specifically to be connected to mobile computing devices. Whether users realize it or not, these devices could infect their mobile computing devices with malicious code or steal their personal data. For example, at DefCon 2011, a charging station was demonstrated that could download personal data from phones connected through the USB port for recharging. There is also a risk that a mobile device that is already infected with malicious code could then infect the device to which the user connects it, which can also be a concern for the user (e.g., the user's desktop computer, the car's onboard computer, etc.).

It would be desirable to address this issue.

SUMMARY

Access to a mobile computing device by a connected external device is limited, based on the context of the connection. The connection of the mobile computing device to an external device is detected. This can comprise detecting that the mobile computing device has been physically coupled to an external device, for example through a USB connection. In some embodiments, this can comprise detecting that the mobile computing device has been communicatively coupled to an external device through a wireless protocol such as Bluetooth. An identifier of the connected external device is gleaned, such as a USB id. In some embodiments, the gleaned identifier is looked-up in a database of mappings between identifiers and descriptions of specific devices, such as the USB id repository. The connected external device is classified as being of a specific functional category, based on the gleaned identifier (and in some embodiments the description of the external device from the database). The functional category describes a legitimate function to be performed by the connected external device, such as data synchronizing, media playing or battery charging. The connected external device is provided with a level of access to the mobile computing device based on the classified functional category. Where the connected device is a USB device, this can comprise regulating activity on specific pins of the USB connection.

In response to classifying the external device as being of functional category data synchronizing, the connected external device can be provided with read and write access to the mobile computing device. Where the external device is classified as being of functional category media playing, the external device is prevented from writing to the mobile computing device, and is allowed read access only for files in one or more specific media format(s), such as MP3. In cases where the external device is classified as being of functional category battery charging, the external device is denied read and write access to the mobile computing device, and is only allowed to transmit electrons to charge the battery. In a USB based embodiment, this can comprise blocking all communication activity on the two data pins of the USB connection, but allowing a flow of electrons on the power pin. To decrease the charging time, the activity on the two data pins can be monitored, and all data input/output blocked but a flow of electrons to the mobile computing device allowed.

In one embodiment, classifications of the connected external devices are stored. If it is subsequently detected that the mobile computing device is reconnected to an external device with a stored classification, its stored classification is retrieved. The reconnected external device is then provided with a level of access to the mobile device based on the retrieved classification, without reclassifying the external device. In some embodiments, the user of the mobile computing device can review, edit and override classifications of, and levels of access provided to, connected external devices.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
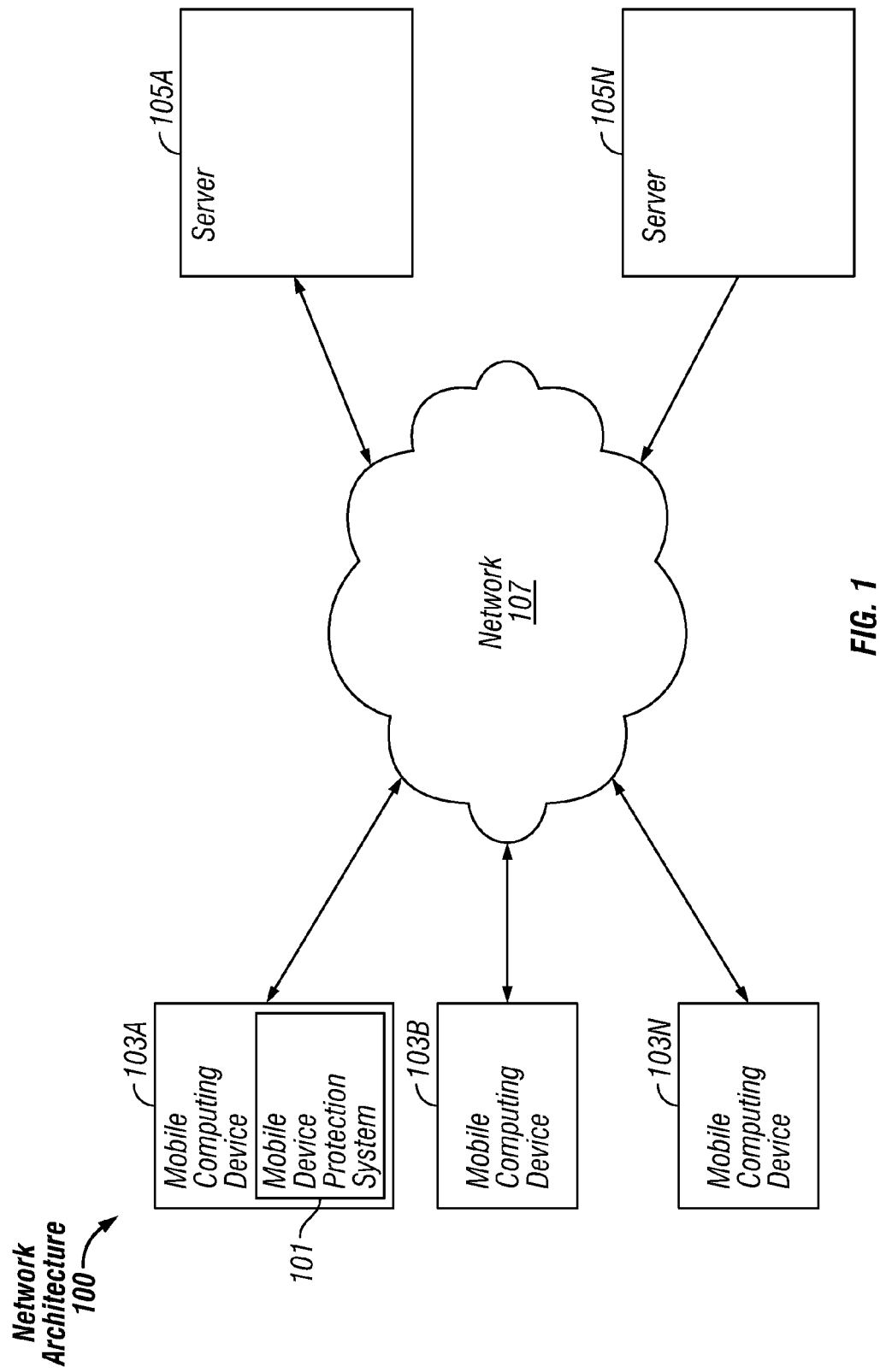
FIG. 1 is a block diagram of an exemplary network architecture in which a mobile device protection system can be implemented, according to some embodiments.

FIG. 1 is a block diagram illustrating an exemplary network architecture 100 in which a mobile device protection system 101 can be implemented. The illustrated network architecture 100 comprises multiple mobile computing devices 103A, 103B and 103N, as well as multiple servers 105A and 105N. In FIG. 1, a the mobile device protection system 101 is illustrated as residing on mobile computing device 103A. It is to be understood that this is an example only, and in various embodiments various functionalities of this system 101 can be instantiated on a server 105, a mobile computing device 103, or can be distributed between multiple mobile computing devices 103 and/or servers 105.

Mobile computing devices 103 and servers 105 can be implemented using computer systems 210 such as the one illustrated in FIG. 2 and described below. The mobile computing devices 103 and servers 105 illustrated in FIG. 1 are communicatively coupled to a network 107, for example via a network interface 248 or modem 247 as described below in conjunction with FIG. 2. Mobile computing devices 103 are able to access applications and/or data on servers 105 using, for example, a web browser or other software (not shown).

Although FIG. 1 illustrates three mobile computing devices and two servers as an example, in practice many more (or fewer) mobile computing devices 103 and/or servers 105 can be deployed. In one embodiment, the network 107 is in the form of the Internet. Other networks 107 or network-based environments can be used in other embodiments.

Figure 2:
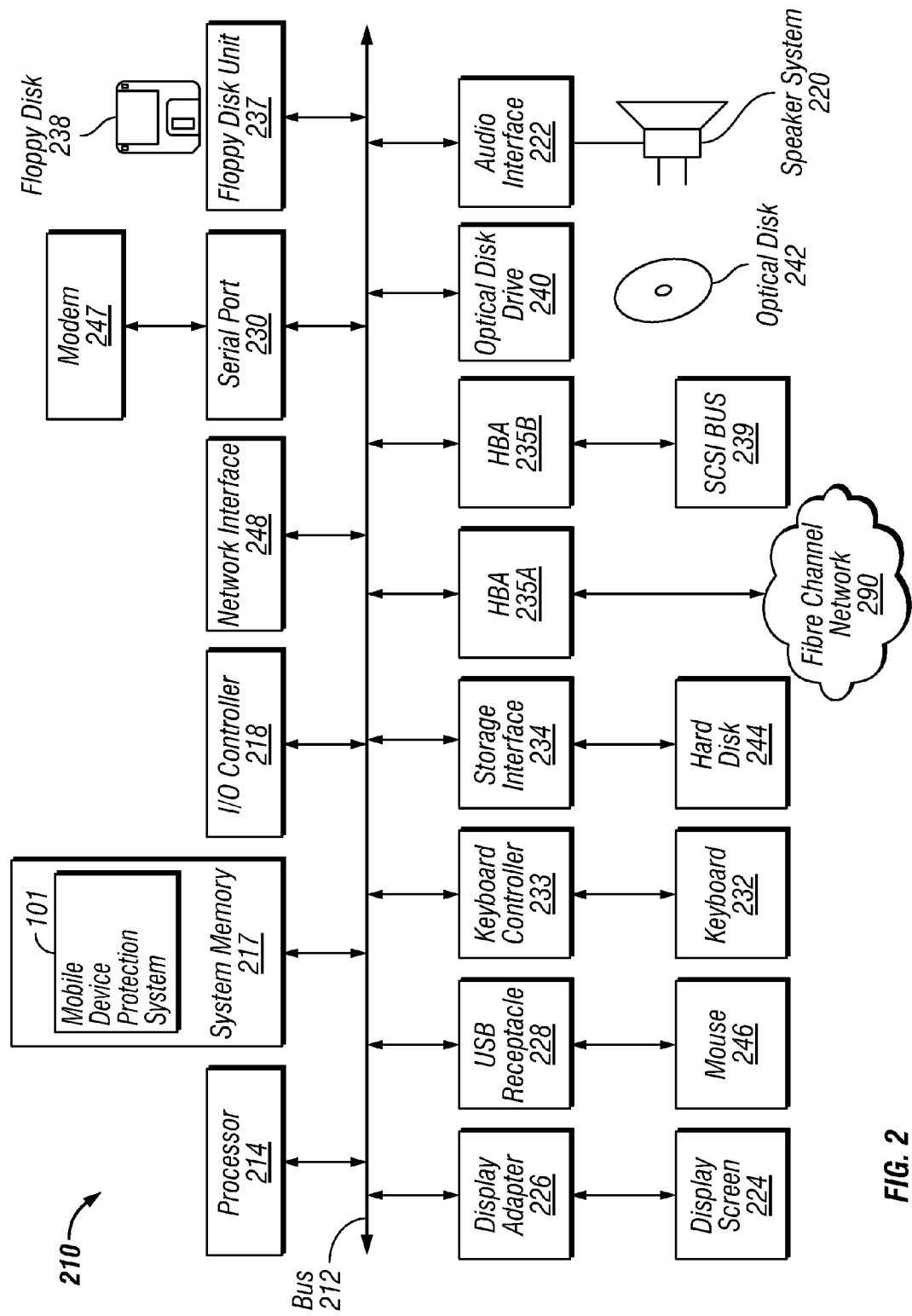
FIG. 2 is a block diagram of a computer system suitable for implementing a mobile device protection system, according to some embodiments.

FIG. 2 is a block diagram of a computer system 210 suitable for implementing a mobile device protection system 101. Both mobile computing devices 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the mobile device protection system 101 is illustrated as residing in system memory 217. The workings of the mobile device protection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
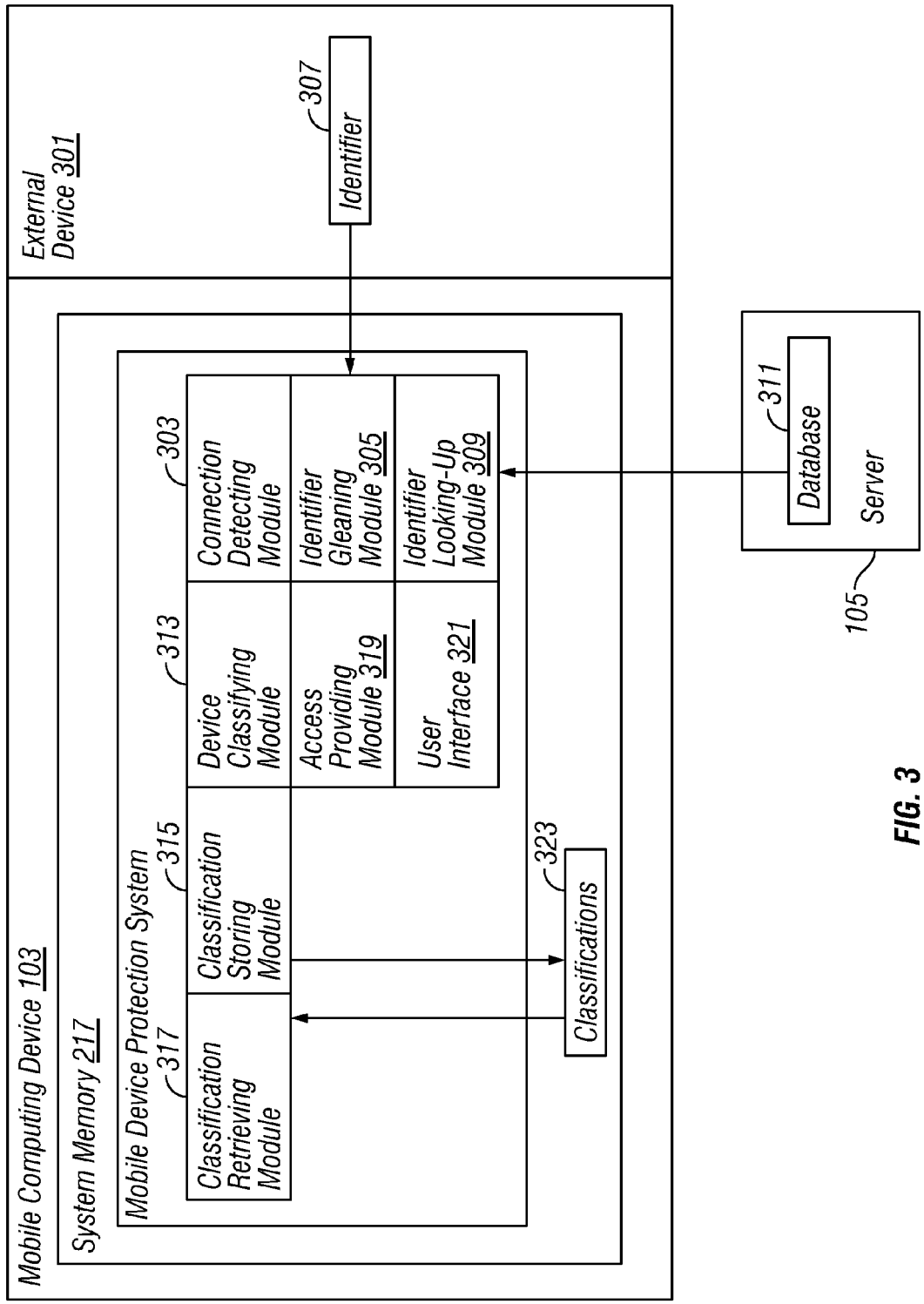
FIG. 3 is a block diagram of the operation of a mobile device protection system, according to some embodiments.

FIG. 3 illustrates the operation of a mobile device protection system 101, according to some embodiments. In FIG. 3, the mobile device protection system 101 is illustrated running in the system memory 217 of a mobile computing device 103. As described above, the functionalities of the mobile device protection system 101 can reside on a mobile computing device 103, a server 105, or be distributed between multiple computer systems 210, including within a cloud-based computing environment in which the functionality of the mobile device protection system 101 is provided as a service over a network 107. It is to be understood that although the mobile device protection system 101 is illustrated in FIG. 3 as a single entity, the illustrated mobile device protection system 101 represents a collection of functionalities, which can be instantiated as a single or multiple modules as desired (an instantiation of specific, multiple modules of the mobile device protection system 101 is illustrated in FIG. 3). It is to be understood that the modules of the mobile device protection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. As used herein the term "mobile computing device" 103 means any easily portable computing device. Some mobile computing devices 103 are described as "smartphones", but even many mobile phones not so designated have these capabilities. Program code to implement the functionalities of the mobile device protection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a mobile device protection system 101 protects a mobile computing device 103 such as a smartphone, tablet computer or MP3 player, when the mobile computing device 103 is connected to external devices 301. By identifying the external device 301 to which the mobile computing device 103 is being connected, the mobile device protection system 101 is able to limit interaction between the mobile computing device 103 and the external device 310 to an appropriate level, based on the external device 310 type and the context of the connection. This prevents external devices 301 from having unneeded levels of access to the mobile computing device 103, thereby providing the mobile computing device 103 with a level of protection from malicious code and data theft.

More specifically, users generally connect their mobile computing devices 103 to external devices 301 for specific reasons: to recharge batteries, to output media (e.g., play music, watch video), or to synchronize data. Most users only connect to a limited number of external devices 301 for data synchronizing, such as their primary home or office computers 210. For outputting media, users may connect their mobile devices 103 to a larger number of external devices 301, such as car stereos, portable music players, home stereo systems, modern blueray players and televisions, various desktop and laptop computers 210, etc. Users also tend to be indiscriminate when charging their mobile computing devices 103, connecting them to external devices 301 for charging wherever available, including charging stations in public places and charging units connected to car stereos, computers, etc.

Different levels of access to the mobile computing device 301 are needed in different connection contexts, as discussed in greater detail below. For example, data synchronization involves reading and writing to and from the mobile computing device 103 by the external device 301. On the other hand, when a mobile computing device 103 is outputting audio or video to an external device 301, it is not required that the external device 301 be able to write to the mobile computing device 103 at all, nor does the external device 301 need to be able to read anything on the mobile computing device 103 other than media files in specific formats, Finally, when charging, data input/output is not necessary at all, as only electrons should be flowing from the external device 301 to the mobile computing device 103. As discussed in detail below, by determining the context of the connection and limiting the external device's access to the mobile computing device 103 accordingly, the mobile device protection system 101 reduces the potential attack vector, and thereby provides protection against external devices 301 infecting the mobile computing device 103 with malicious code or stealing data.

As illustrated in FIG. 3, when the mobile computing device 103 is connected to an external device 301, a connection detecting module 303 of the mobile device protection system 101 detects the connection. It is to be understood that as the term is used herein, "external device" 301 can refer to any hardware apparatus that is physically external to the mobile computing device 103. Non-exhaustive examples include docking stations, desktop computers, laptop computers, music players, video players, in-dash auto computing systems, navigation systems, and chargers.

In one embodiment, the mobile computing device 103 is connected to external devices 301 through a USB connection (e.g., a USB plug on the external device 301 is inserted into a USB receptacle 230 on the mobile computing device 103). In such embodiments, the connection detecting module 303 uses USB functionality on the mobile computing device 103 to detect that the external USB device 301 has been physically connected. (When an external USB device 301 is connected to a USB host (the mobile computing device 103 in this case), the USB device sends a control signal which initiates a handshaking protocol, called the enumeration process.) In other embodiments, external devices 301 can be physically connected to the mobile computing device using a connector other than USB, for example an Apple 30 pin dock station connector, a serial port, a parallel port, etc. In these embodiments, the connection detecting module 303 uses the appropriate onboard functionality (e.g., drivers, controllers, etc.) to detect these physical connections between the mobile computing device 103 and external devices 301 as they are made. In one embodiment, the connection between the mobile computing device 103 and an external device 301 is in the form of a wireless, Bluetooth connection. In other embodiments, other types of wireless connections between the mobile computing device 103 and external devices are supported, e.g., Wi-Fi.

After the connection has been detected, an identifier gleaning module 305 of the mobile device protection system 101 gleans an identifier 307 of the external device 301. For example, every USB device has a device descriptor which includes a vendor id, a product id and a unique serial number. This information is provided by an external USB device 301 as part of the handshaking process when its connected. In USB based embodiments, the identifier gleaning module 305 gleans this information from externally connected USB devices 301. The exact information that the identifier gleaning module 305 treats as an identifier 307 for USB devices can vary between embodiments. For example, in different embodiments the identifier 307 can comprise a USB device descriptor, a USB product or vendor id (in string or numerical format) and/or a USB serial number.

In embodiments involving non-USB external devices 301, the identifier gleaning module 305 gleans non-USB identifiers 307 from connected external devices 301. Depending upon the device type and the protocol used for the connection, different procedures are used to read different types of identifiers 307 from the external device 301 to which the mobile computing device 103 is connected. Under some protocols, an external device 301 provides an identifier 307 to the mobile computing device 103 upon connection as part of the handshaking. In other scenarios, device identifiers 307 reside on the external devices 301 at known locations in memory that can be read by the identifier gleaning module 305. It is to be further understood that the specific format of the identifier 307 varies between device types and protocols. For example, in different embodiments the identifier 307 can comprise a PCI id, a PnP id, an FCC id, a MAC id, a BIOS id, etc.

An identifier 307 gleaned from an external device 301 can be in the form of a numeric code which, by itself, does not provide the mobile device protection system 101 with sufficient information concerning the external device 301. To get such information, an identifier looking-up module 309 of the mobile device protection system 101 can look-up the identifier 307 gleaned from the external device 301 in a global identifier database 311, which stores mappings of numeric ids to textual descriptions of devices. For example, in the case of USB devices, a publicly accessible repository 311 of all known identifiers 307 is maintained. The USB id repository 311 includes USB identifiers 307 of vendors, devices, subsystems, device classes, etc. By looking-up the identifier 307 gleaned from an external USB device connected to the mobile computing device 103 in the USB id repository 311, the external device 301 can be identified with a great deal of specificity. Thus, the identifier looking-up module 309 can determine that the mobile computing device 103 has been connected to, for example, a specific make and model of charging unit, a specific version of an onboard entertainment system in a certain car, a certain music player, a specific docking station, a given make and model of desktop computer 210, etc. Identifier databases 311 other than the USB id repository are also maintained, and can be accessed by the identifier looking-up module 309, for example in non-USB embodiments. Multiple and/or different identifier databases 311 can be accessed in different embodiments as appropriate. Although FIG. 3 illustrates an identifier database 311 residing on a server external to the mobile computing device 103, it is to be understood that in different embodiments, such information (or a subset thereof) can be stored locally on the mobile computing device 103 and/or be distributed between multiple computers 210 as desired.

A device classifying module 313 of the mobile device protection system 101 classifies the connected external device 301 according to functional category. For example, in one embodiment the device classifying module 313 classifies each connected external device as belonging to one of the following functional categories: 1) battery charging, 2) media playing, and 3) data synchronizing. In other embodiments, more or different functional categories can be used. Functional categories describe the legitimate functionality to be performed by the connected external device 301. Thus, the connected external device 301 is provided with a level of access to the mobile computing device 103 based on its functional category, as described in detail below.

The device classifying module 313 can classify the external device 301 based on the look-up of its identifier 307. For example, where an identifier 307 look-up reveals that the external device 301 is a specific make and model of charger, the device classifying module 313 would classify it as being of functional category charging, i.e., the mobile computing device 103 is connected to the external device 301 for the purpose of battery charging, and thus it is appropriate to provide the external device 301 with the (minimal) level of access to the mobile computing device 103 required for this purpose. On the other hand, where the identifier 307 look-up discloses that the external device 301 is a given music player, the device classifying module 313 would classify it as being of functional category media playing, implying a somewhat broader requisite level of access to the mobile computing device 103.

In some embodiments, the device classifying module 313 can classify devices based not on identifier 307 look-up, but instead on the identifier 307 itself, or other identifying information provided by the external device 301. This can be the case where, for example, no identifier database 311 is accessible for the type of identifier 307 in question, but the identifier 307 itself (or additional information available from the external device 301) is specific enough to make a classification 323. Another scenario is the case in which an identifier database 311 is available, but the identifier 307 contains enough information to make the classification 323, rendering the database 311 look-up superfluous. There can also be instances in which case the identifier database 311 does not contain an entry for the specific identifier 307 gleaned from the external device 103, in which the device classifying module 313 can, for example, classify the device 301 by default as being of the functional category that is provided the least access to the mobile computing device 103.

Users tend to connect their mobile devices to certain external devices 301 repeatedly, for example their own chargers, music players, auto systems, docking stations, etc. In one embodiment, a classification storing module 315 of the mobile device protection system 101 stores classifications 323 of specific external devices 301, so that known external devices 301 can be recognized when reconnected to the mobile computing device 103. A classification 323 can comprise an association between the device's identifier 307 and the functional category to which the device 301 has been classified. By storing this information, the mobile device protection system 101 need not look-up the identifier 307 and classify the external device 301 each time it is connected. Instead, upon gleaning the identifier 307 of the external device 301 at connection time, a classification retrieving module 317 of the mobile device protection system 101 can retrieve the stored classification 323 associated with the identifier 307. In such embodiments, when a new external device 301 which has not been previously classified is connected to the mobile computing device 103, then the mobile device protection system 101 performs the steps of looking-up, classifying and storing, as described above.

In one embodiment, classifications 323 are stored at an individual device level, i.e., classifications 323 of specific, individual devices 301 (as opposed to device types or even specific models) are retained and utilized across multiple connections of the same, specific, individual device 301 to the mobile computing device 103. In this case, the classifications 323 are associated with identifiers 307 that are unique to specific, individual devices 301, such as USB serial numbers. In this embodiment, when the mobile computing device 103 is reconnected to, for example, the same auto music player in the same car, the stored classification 323 is retrieved and utilized. However, if the mobile computing device 103 is subsequently connected to the same make and model of music player in a different car, the stored classification 323 is not used. In other embodiments, classifications 323 are stored at a higher level (e.g., make and model of device, type of device, etc.). Thus, in one embodiment a stored classification 323 associated with the identifier 307 of, for example, a specific make and model of charger is used whenever the mobile computing device 103 is connected to any charger of that make and model.

As noted above, the level of access to the mobile computing device 103 that an external device 301 needs to perform its legitimate function varies depending upon what that function is. Thus, an access providing module 319 of the mobile device protection system 101 provides the external device 301 with a level of access appropriate for its functional category. In one embodiment, when an external device 301 without a stored classification 323 is connected to the mobile computing device 103 (e.g., a specific instance or type of external device 301 is connected for the first time), the user is informed the user of the functional category to which the device 301 has been classified, and prompted to approve or override the classification 323. For example, where a newly connected external device 301 has been classified as being a charger, the output to the user could indicate "You appear to be connecting to a charger. Please tap 'OK' to enforce the access policy for chargers, or 'Menu' for options." Selecting 'OK' would result in the access providing module 319 providing the external device 301 with charger level access, whereas pressing 'Menu' would display a menu giving the user options, such as classifying the external device differently or not enforcing any access policy. This communication with the user can be conducted through a user interface 321 provided by the mobile device protection system 101. In another embodiment, rather than prompting the user, the access providing module 319 provides new devices 301 with the access level based on their classification 323 by default, but the user has an option of overriding defaults and manually changing classifications 323 as discussed below.

Where a stored classification 323 already exists for a connected external device (i.e., a known device 301 is being reconnected), the access providing module 319 typically automatically provides the external device 301 with the level of access for the functional category from the stored classification 323, without prompting the user. Where desired, the user can also be prompted: e.g., "You are connecting to the music player in your car. Enforce media player access 'Y/N'?". Typically, the user can edit stored classifications 323, override default or customized access levels for specific devices or functional categories, and make other similar changes, for example through the user interface 321 provided by the mobile device protection system 101.

Data synchronizing requires that the external device 301 have read write access to the mobile computing device 103, and vice versa. Thus, an infected or malicious external device can spread malicious code to and/or steal data from the mobile computing device 103 (the mobile computing device 103 can also infect the external device 301). For this reason, it is best practice to only synchronize data between trusted devices. In some embodiments, before allowing an external device 301 data synchronizing access, the user is provided with extra or more stringent prompting to ensure that the user really wishes to allow the external device 301 this level of access. In other embodiments, one or a small set of known external devices 301 are excluded from this level of prompting (e.g., an external device 301 previously established as being the user's primary home computer 210).

Media playing, such as playing music or video files on the mobile computing device 103 through speakers or a screen on the external device 301, does not require that the external device 301 be provided with any write access to the mobile computing device 103, and only limited read access. Thus, the access providing module 319 prevents the external device from writing to the mobile computing device 103 at all, and allows only reads of specific file type(s), e.g., MP3, MPEG, etc. The specific file types to allow to be read can vary between embodiments, and can be divided between functional categories at any level of granularity (e.g., a music only mode that allows the reading of music files but not video files, a mode that allows reading of music files in any format, a mode that allows reading of only a specific music file format, etc.).

When an external device is classified as being of functional category media playing (or any similar, more specific category), the access providing module 319 blocks all attempts by the external device 301 to write to the mobile computing device 103, and blocks any attempts by the external device 301 to read files on the mobile computing device 103 other than those in format(s) permitted by the functional category. In one embodiment, the access providing module 319 blocks write and unauthorized read attempts by monitoring attempts to access the file system on the mobile computing device 103 (e.g., with a file system filter driver, by intercepting operating system calls for file i/o, etc.). In other embodiments, the access providing module 319 executes the monitoring and blocking at another (e.g., lower) level as desired. By restricting the level of access as described above, the access providing module 319 prevents the external device 301 from infecting the mobile computing device 103 with malicious code. Because the external device 301 can still read files on the mobile computing device 103 in certain formats, technically the external device 301 could steal data in those formats from the mobile computing device 103 (e.g., copy the user's personal videos in a mode where reading video formats is permitted). The mobile computing device 103 itself could still potentially attack the external device 301 with malicious code hidden in a media file (e.g., an infection embedded in an MP3) read by the external device 301 for output.

Charging does not require that any reading or writing occur between the external device 301 and the mobile computing device 103. Instead, only electrons need to flow from the external device 301 to the mobile computing device 103. Thus, in this mode the access providing module 319 blocks all data i/o between the devices. Depending upon the type of external device 301, the access providing module 319 can execute different functionality to allow charging activity only. For example, a USB port has four pins: ground, power, and two data pins. The access providing module 319 can use USB services to block all activity on the data pins, thus allowing only the flow of electrons on the power pin. In another embodiment, the access providing module 319 allows the flow of electrons from the external device 301 to the mobile computing device 103 on the two data pins as well, because this makes the charging process faster. In this embodiment, the access providing module 319 monitors activity on the two data pins at a USB level, and blocks any attempt to read or write data to/from the mobile computing device 103. In another embodiment, the access providing module 319 performs the monitoring and blocking at a higher or different level, e.g., by monitoring attempts to access the file system on the mobile computing device 103. Some types of mobile computing devices 103 (e.g., Apple's iPhone®) require an authentication of the charger at connection time (the authentication comprises a handshake between the iPhone and a chip in the charger). In such cases, the access providing module 319 provides the access necessary to complete the handshaking, after which only the electron flow is permitted.

It is to be understood that the specific access levels to allow for different functional categories can vary between embodiments.

Figure 4:
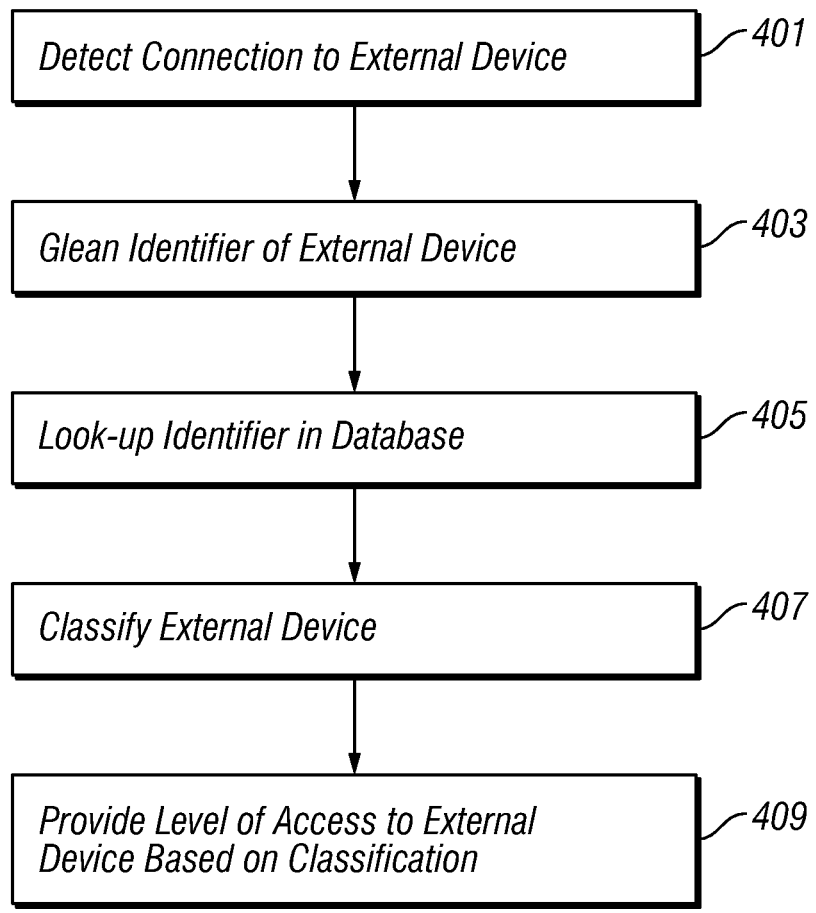
FIG. 4 is a flowchart of the operation of a mobile device protection system, according to some embodiments.

FIG. 4 illustrates steps of the operation of the mobile device protection system 101, according to some embodiments. The connection detecting module 303 detects 401 that the mobile computing device 103 has been connected to an external device 301. The identifier gleaning module 305 gleans 403 an identifier 307 of the connected external device 301. The identifier looking-up module 309 looks-up 405 the gleaned identifier 307 in a global identifier database 311, wherein the database 311 contains a mapping between the gleaned identifier 307 and a description of the connected external device 301. The device classifying module 313 classifies 407 the connected external device 301 as being of a specific functional category, based on the gleaned identifier 307 and the description of the external device 301 from the database 311. An access providing module 319 provides 409 the connected external device 301 with a level of access to the mobile computing device 103, based on the classified functional category of the external device 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for limiting access to a mobile computing device by a connected external device, the method comprising:
   detecting that the mobile computing device has been physically coupled to an external USB device through a USB connection;
   gleaning a USB identifier of the connected external USB device;
   looking-up the gleaned USB identifier in a USB id repository that contains a mapping between the gleaned USB identifier and a textual description of the connected external USB device;
   classifying the connected external USB device as being of a specific functional category, based on the textual description of the connected external USB device from the USB id repository;
   responsive to classifying the connected external USB device as being of functional category battery charging, wherein the physical USB connection comprises two data pins, one power pin and one ground pin;
   limiting access by the external USB device to the mobile computing device by one of:
   blocking all communication activity on the two data pins of the physical USB connection; and
   monitoring activity on the two data pins of the physical Universal Serial Bus (USB) connection while blocking data input/output but allowing a flow of electrons on the two data pins;
   the method further comprising:
   allowing a flow of electrons on the power pin.

2. The method of claim 1,
   wherein limiting access by the external USB device to the mobile computing device comprises:
      preventing the external USB device from writing to and reading from the mobile computing device; and
      allowing the connected external USB device to transmit electrons to the mobile computing device.

3. The method of claim 1 further comprising:
   storing the classification of the connected external USB device as being of a specific functional category;
   subsequently to the mobile computing device being decoupled from the external USB device, detecting that the mobile computing device has been reconnected to the external USB device;
   retrieving the stored classification of the connected external USB device as being of the specific functional category; and
   providing the reconnected external USB device with a level of access to the mobile device based on the retrieved classification, without reclassifying the external USB device.

4. The method of claim 1 further comprising:
   receiving input from a user of the mobile computing device concerning the classification of the connected external USB device;
   in response to the received input from the user, modifying the classification.

5. The method of claim 1 further comprising:
   receiving input from a user of the mobile computing device concerning the level of access to the mobile device to provide to the external USB device;
   in response to the received input from the user, modifying the level of access.

6. At least one non-transitory computer readable medium storing a computer program product for limiting access to a mobile computing device by a connected external device, the computer program product comprising:
   program code for detecting that the mobile computing device has been physically coupled to an external USB device through a USB connection;
   program code for gleaning a USB identifier of the connected external USB device;
   program code for looking-up the gleaned USB identifier in a USB id repository that contains a mapping between the gleaned USB identifier and a textual description of the connected external USB device;
   program code for classifying the connected external device as being of a specific functional category, based on the textual description of the connected external USB device from the USB id repository;
   program code for, responsive to classifying the connected external device as being of functional category battery charging, wherein the physical USB connection comprises a plurality of two data pins, one power pin and one ground pin;
   program code for limiting access by the external device to the mobile computing device by one of:
   blocking all communication activity on the two data pins of the physical USB connection; and
   monitoring activity on the two data pins of the physical Universal Serial Bus (USB) connection while blocking data input/output but allowing a flow of electrons on the two data pins;
   further comprising program code for allowing a flow of electrons on the power pin.

7. The computer program product of claim 6 wherein the program code for classifying the connected external USB device as being of a specific functional category, based on at least the gleaned identifier, further comprises:
   program code for classifying the external USB device as being of a functional category from a group of functional categories consisting of: 1) data synchronizing, 2) media playing, and 3) battery charging.

8. The computer program product of claim 6 further comprising:
   program code for storing the classification of the connected external USB device as being of a specific functional category;
   program code for subsequently to the mobile computing device being decoupled from the external USB device, detecting that the mobile computing device has been reconnected to the external USB device;

program code for retrieving the stored classification of the connected external USB device as being of the specific functional category; and program code for providing the reconnected external USB device with a level of access to the mobile device based on the retrieved classification, without reclassifying the external USB device.

9. A mobile computing device comprising:

a processor;

computer memory;

at least one connection detecting module residing in the computer memory, for:

detecting that the mobile computing device has been physically coupled to an external USB device through a USB connection;

an identifier gleaning module residing in the computer memory, for gleaning a USB identifier of the connected external USB device;

an identifier looking-up module residing in the computer memory, for looking-up the gleaned USB identifier in a USB id repository that contains a mapping between the gleaned USB identifier and a textual description of the connected external USB device;

a device classifying module residing in the computer memory, for classifying the connected external USB device as being of a specific functional category, based on the textual description of the connected external USB device from the USB id repository;

an access providing module residing in the computer memory, for, responsive to classifying the connected external USB device as being of functional category battery charging, wherein the physical USB connection comprises two data pins, one power pin and one ground pin;

limiting access by the external USB device to the mobile computing device by one of:

blocking all communication activity on the two data pins of the physical USB connection; and monitoring activity on the two data pins of the physical Universal Serial Bus (USB) connection while blocking data input/output but allowing a flow of electrons on the two data pins;

and the access providing module further allowing a flow of electrons on the power pin.

\* \* \* \* \*